United States Patent
Feng et al.

(10) Patent No.: US 8,804,962 B2
(45) Date of Patent: Aug. 12, 2014

(54) METHOD AND SYSTEM FOR ESTABLISHING ENHANCED AIR INTERFACE KEY

(75) Inventors: Chengyan Feng, Shenzhen (CN); Lu Gan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 13/521,977

(22) PCT Filed: Mar. 10, 2011

(86) PCT No.: PCT/CN2011/071692
§ 371 (c)(1),
(2), (4) Date: Jul. 12, 2012

(87) PCT Pub. No.: WO2011/131063
PCT Pub. Date: Oct. 27, 2011

(65) Prior Publication Data
US 2012/0294444 A1 Nov. 22, 2012

(30) Foreign Application Priority Data

Apr. 20, 2010 (CN) .......................... 2010 1 0167336

(51) Int. Cl.
| | |
|---|---|
| *H04L 9/14* | (2006.01) |
| *H04W 12/04* | (2009.01) |
| *H04W 36/00* | (2009.01) |
| *H04L 29/06* | (2006.01) |

(52) U.S. Cl.
CPC .......... *H04W 12/04* (2013.01); *H04W 36/0038* (2013.01); *H04L 2463/061* (2013.01); *H04L 63/205* (2013.01); *H04L 63/06* (2013.01)
USPC ...................................................... 380/272

(58) Field of Classification Search
CPC ............ H04W 12/04; H04W 36/0066; H04W 36/0083
USPC .......................................... 380/270, 272, 273
See application file for complete search history.

(56) References Cited

U.S. PATENT DOCUMENTS

2008/0095362 A1* 4/2008 Blom et al. ..................... 380/45
2008/0120700 A1* 5/2008 Pandey et al. ..................... 726/4
(Continued)

FOREIGN PATENT DOCUMENTS

| | | |
|---|---|---|
| CN | 101128033 A | 2/2008 |
| CN | 101287285 A | 10/2008 |

(Continued)

OTHER PUBLICATIONS

International Search Report in international application No. PCT/CN2011/071692, mailed on Jun. 23, 2011.

(Continued)

*Primary Examiner* — Ellen Tran
(74) *Attorney, Agent, or Firm* — Oppedahl Patent Law Firm LLC (57) ABSTRACT

The disclosure provides a method and a system for establishing an enhanced air interface key. During a serving Radio Network Controller (RNC) relocation process, a target RNC with an enhanced security capability enables a received legacy key to perform security protection on communication in the serving RNC relocation process when the target RNC cannot learn from a relocation request sent by a source RNC whether or not a user equipment supports the enhanced security capability (500); and when the target RNC receives a message from the user equipment and learns that the user equipment supports the enhanced security capability, the target RNC notifies a core network to establish and enable the enhanced air interface keys on the network side and in the user equipment respectively (501). With the method of the disclosure, during the Serving Radio Network Controller (SRNC) relocation of the user equipment in a wireless communication system, when the air interface keys are enabled and the legacy or enhanced user equipment moves between a legacy network and an enhanced network, timely enabling of security keys is achieved with respect to different security capabilities, ensuring normal accomplishment of the relocation process, and therefore ensuring normal proceeding of subsequent communication.

13 Claims, 8 Drawing Sheets

(56) References Cited

U.S. PATENT DOCUMENTS

2010/0041403 A1* 2/2010 Khetawat et al. .......... 455/435.1
2010/0159882 A1* 6/2010 He ................................ 455/411

FOREIGN PATENT DOCUMENTS

| CN | 101616388 A | 12/2009 |
| CN | 101835154 A | 9/2010 |
| JP | H1020779 A | 1/1998 |
| JP | 2002232418 A | 8/2002 |
| JP | 2009531952 A | 9/2009 |
| WO | 2009157172 A1 | 12/2009 |

OTHER PUBLICATIONS

English Translation of the Written Opinion of the International Search Authority in international application No. PCT/CN2011/071692, mailed on Jun. 23, 2011.

Qualcomm Incorporated: "Proposed solution for CN and RAN key seperation in UTRAN KH", 3GPP Draft; S3-100560, 3rd Generation Partnership Project (3GPP), Mobile Competence Centre; 650, Route des Lucioles; F-06921 Sophia-Antipolis Cedex; France, vol. SA WG3, no. Lisbon; Apr. 19, 2010. (10 pages—see Supplementary European Search Report in European application No. 11771516.9 for relevant pages).

3GPP SA3: "LS on Key change in LTE active mode", 3GPP Draft; S3-070475_LS on Key Change in LTE Active Mode, 3rd Generation Partnership Project (3GPP), Mobile Competence Centre; 650, Route des Lucioles; F-06921 Sophia-Antipolis Cedex; France, vol. SA WG3, no. Tallinn, Estonia; May 29, 2007. (3 pages—see Supplementary European Search Report in European application No. 11771516.9 for relevant pages).

"3rd Generation Partnership Project; Technical Specification Group Services and System Aspects; Study on the Introduction of Key Hierarchy in UTRAN (Release 9)", 3GPP Draft; S3-100319_CB, 3rd Generation Partnership Project (3GPP), Mobile Competence Centre; 650, Route des Lucioles; F-06921 Sophia-Antipolis Cedex; France, vol. SA WG3, no. China; Feb. 5, 2010. (17 pages—see Supplementary European Search Report in European application No. 11771516.9 for relevant pages).

Supplementary European Search Report in European application No. 11771516.9, mailed on Dec. 5, 2013. (7 pages).

* cited by examiner

METHOD AND SYSTEM FOR ESTABLISHING ENHANCED AIR INTERFACE KEY

TECHNICAL FIELD

The disclosure relates to a Serving Radio Network Controller (SRNC) relocation technology, and in particular to a method and a system for establishing an enhanced air interface key, which can normally enable the air interface key so as to ensure the normal accomplishment of the relocation process.

BACKGROUND

The 3rd Generation Partnership Project (3GPP) adopts Orthogonal Frequency Division Multiplexing (OFDM) and Multiple-Input Multiple-Output (MIMO) technologies in Release7 to finish a future evolution path HSPA+ of High Speed Downlink Packet Access (HSDPA) and High Speed Uplink Packet Access (HSUPA). HSPA+ is an enhancement technology of 3GPP HSPA (including HSDPA and HSUPA), providing an approach of smooth evolution from HSPA to Long Term Evolution (LTE) with low complexity and low cost for the HSPA operator.

HSPA+ improves the peak data rate and spectrum efficiency by using technologies such as high order modulation (e.g., downlink 64 Quadrature Amplitude Modulation (QAM) and uplink 16QAM), MIMO, combination of high order modulation and MIMO, etc. On the other hand, in order to better support the packet service, HSPA+ further adopts a series of other enhancement technologies in order to increase user capacity, reduce time delay and terminal power consumption, improve support of Voice over IP (VoIP), enhance multicast/broadcast capability of the system, and so on.

Figure 1:
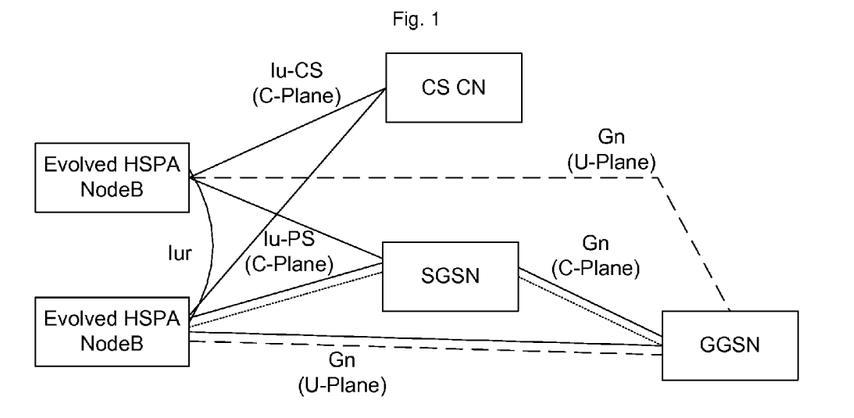
FIG. 1 is a diagram of an existing completely flat radio access network architecture.

In comparison with HSPA, HSPA+ transfers, in its system architecture, the function of the Radio Network Controller (RNC) to a base station Node B, forming a completely flat radio access network architecture, as shown in FIG. 1, in which the dotted line connection indicates Gn User Plane (UP, U-Plane) with a direct tunnel, and the solid line connection indicates Gn UP without direct tunnel. Wherein the Node B integrating the entire RNC function is called Evolved HSPA Node B or enhanced Node B (Node B+). SGSN+ is a Service GPRS (General Packet Radio System) Support Node (SGSN) that is updated to support HSPA+ security function. ME+ is a user terminal equipment capable of supporting HSPA+ security function. An evolved HSPA system can use the 3GPP Rel-5 and later versions of air interface, without any modification of HSPA service of air interface. With this scheme, each Node B+ becomes a node equivalent to the RNC, which has an Iu-PS interface and is capable of direct connection with a PS Core Network (CN), wherein the Iu-PS user plane terminates at the SGSN, and when the network supports direct tunnel function, the Iu-PS user plane can also terminate at a Gateway GPRS Support Node (GGSN). The communication between evolved HSPA Node Bs is performed through an Iur interface. The Node B+ has the capability of independent networking, and supports the entire mobility function, including inter-system switching and intra-system switching.

Figure 2:
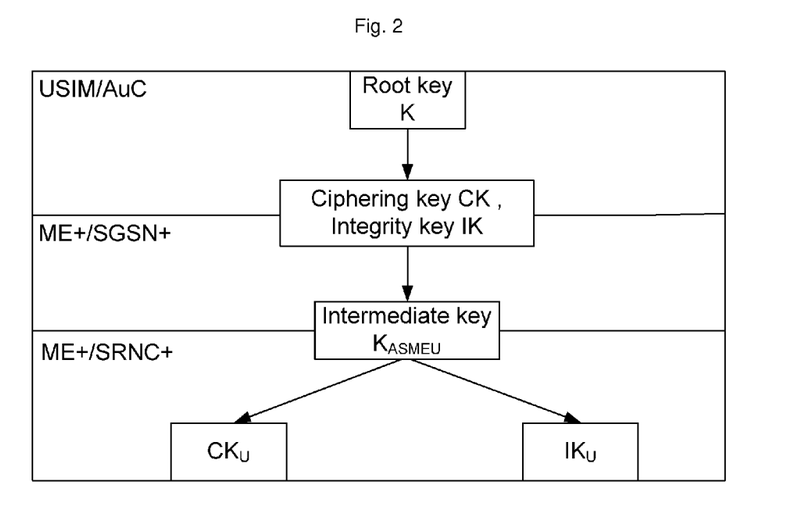
FIG. 2 is a diagram of the currently defined enhanced security key hierarchy HSPA+.

As the data of U-Plane can directly reach the GGSN without passing through the RNC after flattening, this means that the function of encryption and integrity protection of the user plane has to be moved to the Node B+. The enhanced security key hierarchy of currently defined HSPA+ is as shown in FIG. 2, in which the definitions of the root key (K), Ciphering Key (CK), and Integrity Key (IK) are identical with those in the Universal Mobile Telecommunications System (UMTS). Namely, the root key K is the one stored in the Authentication Center (AuC) and Universal Subscriber Identity Module (USIM), and the ciphering key CK and integrity key IK are those calculated from the root key K when the user equipment performs Authentication and Key Agreement (AKA) with the HSS (Home Subscriber Server).

In the UMTS, the RNC performs encryption and integrity protection on the data using the ciphering key CK and integrity key IK. However, as in the HSPA+ architecture, the function of the RNC is completely transferred to the base station Node B+, both encryption and decryption have to be performed at the Node B+. Meanwhile, the security of the Node B+ is not particularly high as the Node B+ is located in unsecured environment. Therefore, HSPA+ introduces a key hierarchy similar to Evolved Universal Terrestrial Radio Access Network (EUTRAN), i.e., UTRAN key hierarchy. In the UTRAN key hierarchy, the intermediate key $K_{RNC}$ (also called $K_{ASMEU}$) is the key newly introduced by HSPA+, and is derived from the ciphering key CK and integrity key IK. Further, the $K_{ASMEU}$ generates $CK_U$ and $IK_U$, where the $CK_U$ is configured to encrypt the user plane data and control plane signaling, and the $IK_U$ is configured to perform integrity protection on the control plane signaling. For clarity, in the specification, the CK and IK are called legacy air interface keys (i.e., legacy keys), and the $CK_U$ and $IK_U$ are called enhanced air interface keys (i.e., enhanced keys).

In the WCDMA (Wideband Code Division Multiple Access) system, due to the introduction of Iur interface, concepts of Serving RNC (SRNC) and Drift RNC (DRNC) are created. Both SRNC and DRNC are logical concepts with respect to a specific user equipment (UE). That is, for the UE, among the connections between the UE and the CN, the RNC directly connected with the CN and in control of all resources of the UE is called the SRNC of the UE; among the connections between the UE and the CN, the RNC not connected with the CN and merely provides resources for the UE is called the DRNC of the UE. The connected UE must and only have one SRNC, and may have no DRNC, or have one or more DRNCs.

SRNC relocation means the process that the SRNC of the UE shift from one RNC to another. According to different location of the UE before and after relocation, the relocation can be classified as static relocation and accompanied relocation, or as UE-not-involved relocation and UE-involved relocation.

Figure 3:
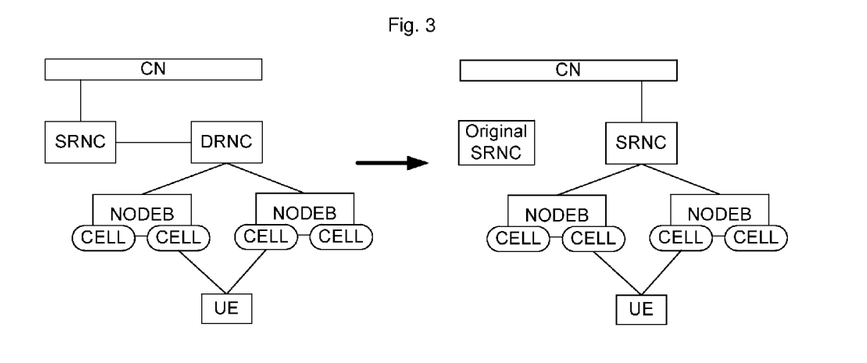
FIG. 3 is a diagram of existing implementation of static relocation.

The condition that static relocation occurs is that the UE is connected from one and only one DRNC. As no UE is involved in the relocation process, it is also called UE-not-involved relocation. After relocation, the connection of Iur interface is released, the Iu interface relocates, and the original DRNC becomes an SRNC, as shown in FIG. 3. Static relocation is caused by soft handover. Because of the Iur interface, the relocation is not very urgent and starts after all the radio links are connected to the DRNC.

Figure 4:
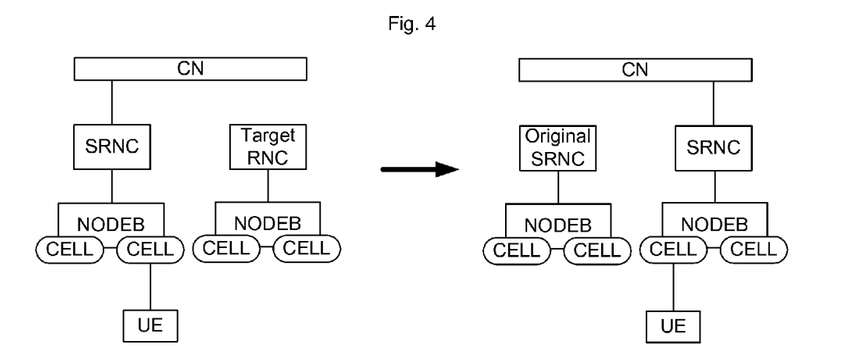
FIG. 4 is a diagram of existing implementation of accompanied relocation.

Accompanied relocation means the process that the UE is handed over to the target RNC from the SRNC in a hard handover manner, and the Iu interface changes simultaneously, as shown in FIG. 4. As UE is involved in the relocation process, it is also called UE-involved relocation.

In the UMTS system, both the ciphering key CK and the integrity key IK do not change before and after SRNC relocation. The DRNC obtains integrity protection information (including integrity key IK and the allowed integrity protection algorithm) and/or ciphering information (including ciphering key CK and the allowed ciphering algorithm) of the UE from the SRNC or SGSN.

In SRNC relocation involved in HSPA+, the Node B+ may be considered as the combination of Node B and RNC. The two are one physical entity, but may still be considered as two different logic entities. Therefore, in the specification, the logic module within the Node B+ supporting HSPA+ key hierarchy may also be considered as the upgraded RNC in the UMTS. For clarity, it is called RNC+ in this specification. Therefore, the SRNC+ and the source Node B+ are identical, and the DRNC+ and the target Node B+ are identical in this specification.

In the actual network layout, the enhanced network entity supporting HSPA+ security function and the legacy network entity not supporting HSPA+ coexist, and enhanced user equipment and the legacy user equipment coexist. Therefore, when SRNC relocation occurs, there exists a scenario when the user equipment relocates from an enhanced SRNC+ to a legacy target RNC, or a scenario when the user equipment relocates from a legacy SRNC+ to an enhanced target RNC. For example, in the latter case, as the legacy RNC cannot identify the enhanced security capability of the user equipment reported in the initial attach request, during the preparation of SRNC relocation, it is possible that the SRNC has not informed the target RNC of the enhanced security capability of the user equipment in the relocation request message sent by the SRNC to the target RNC; hence the target RNC cannot learn whether the user equipment has the enhanced security capability until receiving the first message (Physical Channel Reconfiguration Complete message or UTRAN Mobility Information Confirm message) sent by the user equipment. However, as provided in the UMTS Standards, the SRNC can decide to let the target RNC send Downlink Dedicated Control Channel (DL DCCH) message (carried in an information unit "RRC information, target RNC to source RNC") and perform integrity protection on the message. After receiving the DL DCCH, the SRNC directly forwards it to the user equipment. It is very likely that the target RNC cannot learn whether the user equipment supports enhanced security or not when sending the message. Hence the target RNC cannot decide whether it should perform integrity protection on the field using the legacy key IK or using the enhanced key $IK_U$. As a result, the relocation process cannot be accomplished normally and the air interface key cannot be enabled normally.

SUMMARY

Accordingly, the main object of the disclosure is to provide a method and a system for establishing an enhanced air interface key, which can normally enable the air interface key so as to ensure normal accomplishment of a relocation process.

In order to achieve the object above, the technical schemes of the disclosure are implemented as follows.

A method for establishing an enhanced air interface key includes:

during a serving Radio Network Controller (RNC) relocation process, when a target RNC with an enhanced security capability cannot learn whether a user equipment supports the enhanced security capability from a relocation request sent by a source RNC, the target RNC enabling a received legacy key to perform security protection on the communication in the serving RNC relocation process; and when receiving a message from the user equipment and learning that the user equipment supports the enhanced security capability, the target RNC notifying a core network to establish and enable the enhanced air interface keys at the network side and in the user equipment respectively.

The message from the user equipment may be a Physical Channel Reconfiguration Complete message or a Universal Terrestrial Radio Access Network (UTRAN) Mobility Information Confirm message.

The step of notifying the core network to establish and enable the enhanced air interface keys at the network side and in the user equipment respectively may include:

the core network initiating an Authentication and Key Agreement (AKA) and Security Mode Command (SMC) process, or an SMC process, establishing the enhanced air interface keys at the network side and in the user equipment respectively and enabling the enhanced air interface keys to perform security protection on subsequent communication.

The SMC process may be performed directly when the core network node has an unused authentication vector or a currently used authentication vector corresponding to the legacy key.

The step of establishing the enhanced air interface keys at the network side and in the user equipment respectively may include:

the core network node deriving an intermediate key $K_{RNC}$ from the legacy key IK/CK; the core network node sending a security-mode command message, in which the intermediate key $K_{RNC}$ is carried, to the target RNC; the target RNC deriving the enhanced keys $IK_U$ and $CK_U$ from the intermediate key $K_{RNC}$; the user equipment deriving the intermediate key $K_{RNC}$ from the legacy key IK/CK, and deriving the enhanced keys $IK_U$ and $CK_U$ from the intermediate key $K_{RNC}$.

The method may further include:

the core network node deriving an intermediate key variant $K_{RNC}*$ from the legacy key IK/CK and the intermediate key $K_{RNC}$, and sending the security mode command message carrying the intermediate key variant $K_{RNC}*$ to the enhanced target RNC+.

The intermediate key variant $K_{RNC}*$ may be associated with a counter NCC; the intermediate key $K_{RNC}$ may correspond to a virtual intermediate key variant $K_{RNC}*$, wherein the associated NCC is 0; and a value of the NCC associated with the intermediate key variant $K_{RNC}*$ derived by the core network node from the legacy key IK/CK and the intermediate key $K_{RNC}$ is 1.

The value of the NCC may be carried in the security-mode command message sent to the enhanced target RNC+.

The step of establishing the enhanced air interface keys at the network side and in the user equipment respectively may include:

the core network node deriving the enhanced keys $IK_U/CK_U$ from the legacy key IK/CK; the core network node sending to the target RNC the security-mode command message carrying the $IK_U/CK_U$; the target RNC storing the received $IK_U/CK_U$; the user equipment deriving the enhanced keys $IK_U$ and $CK_U$ from the legacy key IK/CK and storing the enhanced keys $IK_U$ and $CK_U$.

The step of establishing the enhanced air interface keys at the network side and in the user equipment respectively may include:

the core network node deriving an intermediate key $K_{RNC}$ from the legacy key IK/CK, and deriving the enhanced keys $IK_U/CK_U$ from the intermediate key $K_{RNC}$; the core network node sending to the target RNC the security mode command message carrying the $IK_U/CK_U$; the target RNC storing the received $IK_U/CK_U$; the user equipment deriving the intermediate key $K_{RNC}$ from the legacy key IK/CK, deriving the enhanced keys $IK_U/CK_U$ from the intermediate key $K_{RNC}$, and storing the enhanced keys $IK_U/CK_U$.

The method may further include: when the target RNC learns from the message received from the source RNC that the UE supports the enhanced security capability, the target RNC deriving and enabling the enhanced air interface keys to perform security protection on the communication in the serving RNC relocation process.

The step of enabling the received legacy key to perform security protection on the communication in the serving RNC relocation process may include:

the target RNC enabling the legacy air interface key received from the source RNC and indicating to the user equipment that the target RNC itself supports the enhanced security capability;

the user equipment performing successful verification on the message using the legacy air interface key, when the user equipment supports the enhanced security capability, the user equipment using the legacy air interface key to perform security protection on the message and/or data sent to the target RNC and informing the target RNC of the security capability of the UE itself;

the target RNC performing successful verification on the received message by using the legacy security key, and after learning that the user equipment supports the enhanced security capability, notifying the core network to establish and enable the enhanced air interface keys at the network side and in the user equipment respectively.

The method may further include: when the user equipment does not support the enhanced security capability, performing security protection on the communication by using the legacy air interface key during or after the serving RNC relocation process.

The method may further include: when the target RNC cannot learn that the UE supports the enhanced security capability, continuing to perform security protection on the communication in the serving RNC relocation process by using the legacy air interface key.

The method may further include: when the target RNC does not support the enhanced security capability, performing security protection on the communication by using the legacy air interface key during or after the serving RNC relocation process.

A system for establishing an enhanced air interface key includes at least a source RNC, a target RNC, a core network node and a user equipment, wherein, the source RNC is configured to send a relocation request to the target RNC during relocation;

the target RNC is configured to receive the relocation request from the source RNC, to enable a received legacy key to perform security protection on communication in the serving RNC relocation process when the target RNC cannot learn whether or not the user equipment supports the enhanced security capability, and to send a notification to a core network when learning that the user equipment supports the enhanced security capability according to the message from the user equipment;

the core network node is configured to receive the notification from the target RNC, which triggers a process of establishing and enabling the enhanced air interface keys at the network side and in the user equipment respectively.

Wherein when the target RNC does not support the enhanced security capability or the user equipment does not support the enhanced security capability, the target RNC may be further configured to perform security protection on the communication using the legacy air interface key during or after the serving RNC relocation process.

Wherein when the target RNC cannot learn that the user equipment supports the enhanced security capability, the target RNC may be further configured to continue to perform security protection on the communication in the serving RNC relocation process using the legacy air interface key.

The core network node may be a Service General Packet Radio Service (GPRS) Support Node (SGSN+) supporting a High Speed Packet Access (HSPA+) security function or a Mobile Switching Center (MSC+) supporting the HSPA+ security function.

It can be seen from the technical schemes of the disclosure that, during the relocation of the SRNC, the target RNC with the enhanced security capability enables the received legacy key to perform security protection on communication in the serving RNC relocation process when the target RNC cannot learn from the relocation request sent by the source RNC whether the user equipment supports the enhanced security capability or not; and when the target RNC receives the message from the user equipment and learns that the user equipment supports the enhanced security capability, the target RNC notifies the core network to establish and enable the enhanced air interface keys on the network side and in the user equipment, respectively. With the method of the disclosure, during the SRNC relocation of the user equipment in the wireless communication system, when the air interface keys are enabled and the legacy or enhanced user equipment moves between the legacy network and the enhanced network, timely enabling of security keys is achieved with respect to different security capabilities, ensuring normal accomplishment of the relocation process, and therefore ensuring normal proceeding of subsequent communication.

DETAILED DESCRIPTION

Figure 5:
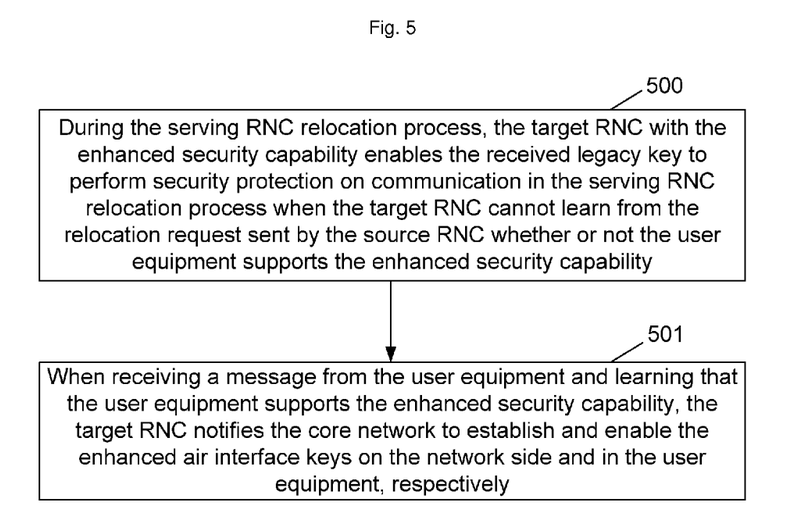
FIG. 5 is a flowchart of a method for establishing an air interface key according to the disclosure.

FIG. 5 is a flowchart of a method for establishing an air interface key according to the disclosure. As shown in FIG. 5, the method includes the following steps:

Step 500: During the relocation of the serving RNC, the target RNC with the enhanced security capability enables the received legacy key to perform security protection on communication in the serving RNC relocation process when the target RNC cannot learn from the relocation request sent by the source RNC whether the user equipment supports the enhanced security capability or not.

During the relocation of the serving RNC, there is a scenario when the user equipment migrates from a legacy SRNC to an enhanced target RNC+, wherein as the legacy RNC cannot identify the enhanced security capability of the user equipment reported in the initial attach request, during the preparation stage of SRNC relocation, it is impossible to inform the target RNC of the enhanced security capability of the user equipment in the relocation request message sent by the source RNC to the target RNC. In this step, when the target RNC cannot learn from the relocation request whether or not the user equipment has the enhanced security capability, the received legacy key is first enabled to perform security protection on communication in the serving RNC relocation process (including message interaction and data plane interaction), so as to ensure the progress of the serving RNC relocation.

Step 501: Upon receiving a message from the user equipment and learning that the user equipment supports the enhanced security capability, the target RNC notifies the core network to establish and enable the enhanced air interface keys on the network side and in the user equipment, respectively.

Only when receiving the first message (Physical Channel Reconfiguration Completion message or UTRAN Mobility Information Confirm message) from the user equipment, can the target RNC learn whether or not the user equipment supports the enhanced security capability; and when learning that the user equipment supports the enhanced security capability, the target RNC notifies the core network to initiate an AKA and SMC process, or an SMC process to establish and enable the enhanced air interface keys on the network side and in the user equipment respectively to perform security protection on the communication between the user equipment and the network.

Figure 6:
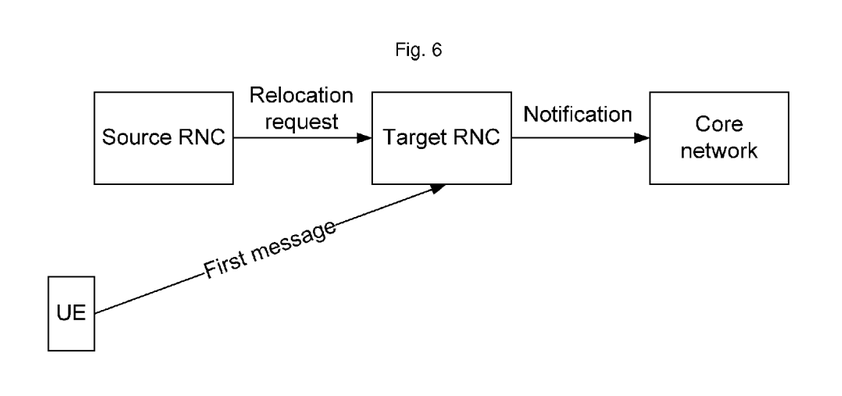
FIG. 6 is a diagram illustrating the composition structure of a system for establishing an air interface key according to the disclosure.

A system for establishing an enhanced air interface key is further provided in accordance with the method of the disclosure, as shown in FIG. 6, wherein the system includes at least a source RNC, a target RNC, a core network node, and a user equipment, wherein the source RNC is configured to send a relocation request to the target RNC during relocation;

the target RNC is configured to receive the relocation request from the source RNC, enable a received legacy key to perform security protection on the communication in the serving RNC relocation process when the target RNC cannot learn whether or not the user equipment supports the enhanced security capability, and send a notification to a core network when learning that the user equipment supports the enhanced security capability according to the message from the user equipment;

the core network node is configured to receive the notification from the target RNC and trigger the process to establish and enable the enhanced air interface keys on the network side and in the user equipment respectively; wherein the core network node is an SGSN+ or a Mobile Switching Center supporting HSPA+ security function (MSC+).

Figure 7:
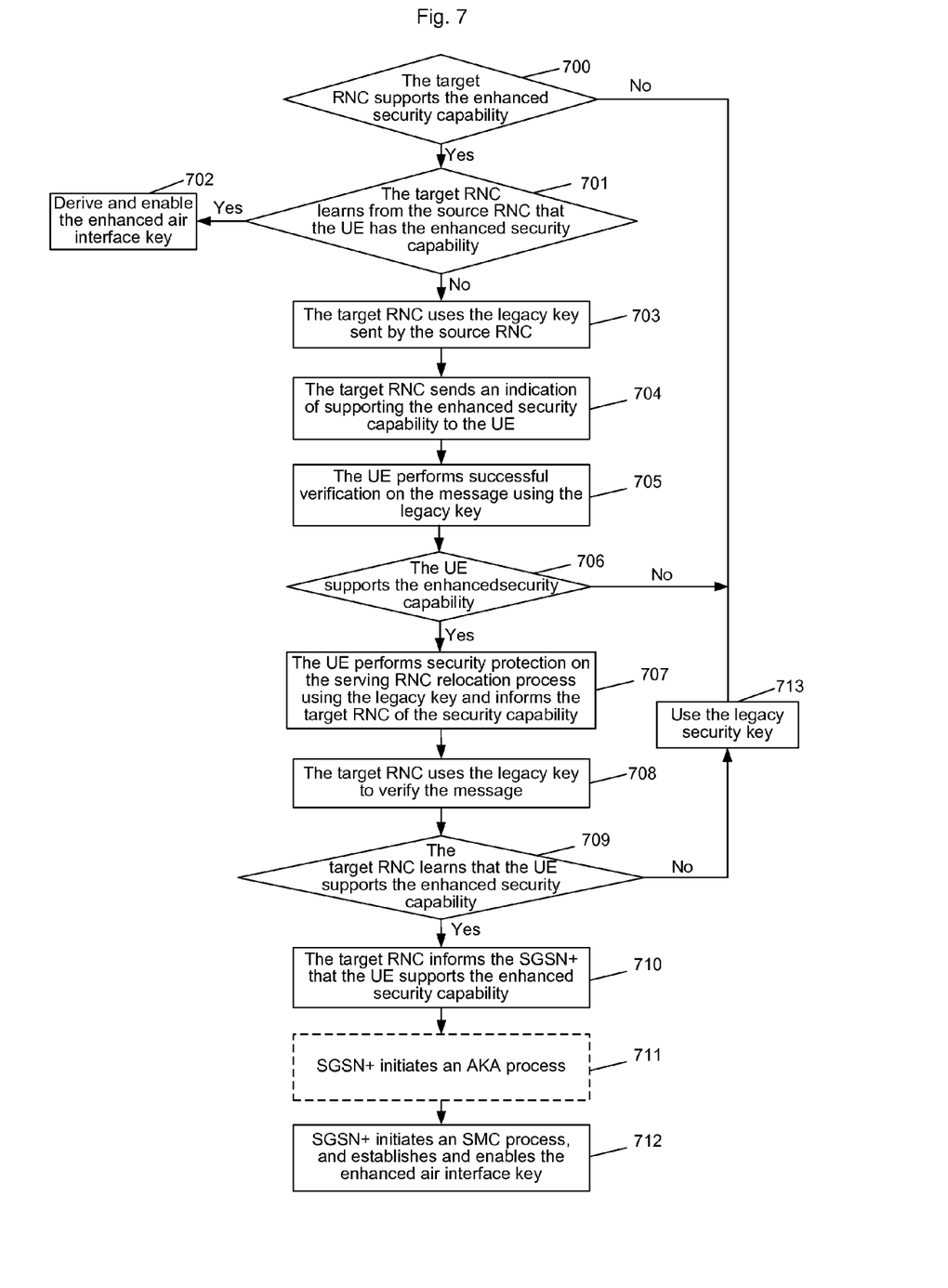
FIG. 7 is a flowchart of an embodiment of establishing an air interface key according to the disclosure.

FIG. 7 is a flowchart of an embodiment of establishing an air interface key according to the disclosure. As shown in FIG. 7, the method includes the following steps:

Step 700: determine whether the target RNC supports the enhanced security capability, if so, proceed to Step 701, otherwise proceed to Step 713.

Step 701: determine whether the target RNC can learn whether the UE supports the enhanced security capability by receiving a message from the source RNC, if so, proceed to Step 702, otherwise proceed to Step 703.

Step 702: The target RNC derives and enables the enhanced air interface key to perform security protection on communication in the serving RNC relocation process, and the process ends.

Step 703: The target RNC enables the legacy air interface key received from the source RNC.

Step 704: The target RNC informs the UE that the target RNC itself supports the enhanced security capability.

Step 705: The UE performs successful verification on the message by using the legacy air interface key.

Step 706: Determine whether the UE supports the enhanced security capability, if so, proceed to Step 707, otherwise continue to Step 713, and continue to use the legacy air interface key.

Step 707: The user equipment performs security protection on the message sent to the target RNC by using the legacy air interface key, and informs the target RNC the security capability of the UE.

Step 708: The target RNC performs successful verification on the received message using the legacy security key.

Step 709: The target RNC learns whether the UE supports the enhanced security capability, if so, proceed to Step 710, otherwise proceed to Step 713 to continue to use the legacy air interface key to perform security protection on subsequent communication.

Step 710: The target RNC informs the SGSN+ or MSC+ on the network side that the UE supports the enhanced security capability.

Step 711: Optionally, the SGSN+ or MSC+ on the network side initiates an AKA process.

Step 712: The SGSN+ or MSC+ on the network side initiates an SMC process to establish and enable the enhanced air interface keys on the network side and in the user equipment respectively, after which security protection on subsequent communication is performed using the enhanced air interface key, and the process ends.

Step 713: Use the legacy air interface key to perform security protection on communication during or after the serving RNC relocation process.

The application of the method of the disclosure will be described in detail below with embodiments.

Figure 8:
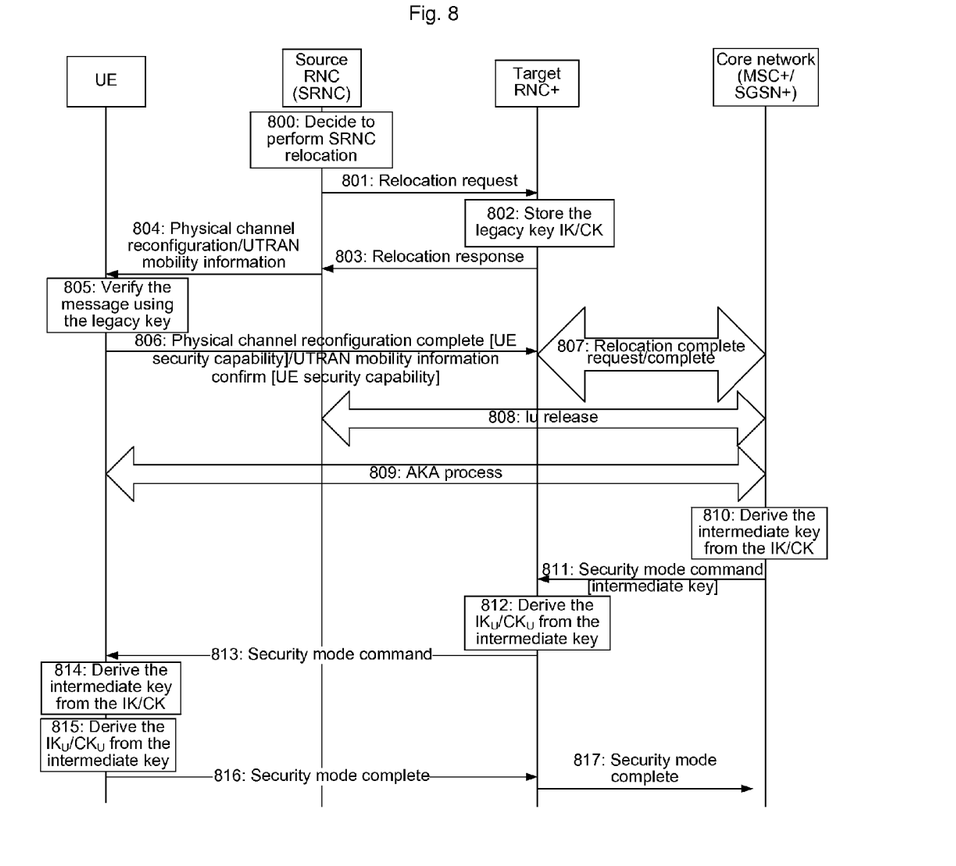
FIG. 8 is a flowchart of a first embodiment in which a security key is used when an enhanced user equipment moves from a legacy UTRAN network to an enhanced UTRAN network according to the disclosure.

FIG. 8 is a flowchart of a first embodiment in which a security key is used when an enhanced user equipment moves from a legacy UTRAN network to an enhanced UTRAN network according to the disclosure. The embodiment is of a method of using the security key when an enhanced user equipment moves from a legacy UTRAN network to an enhanced UTRAN network. In the first embodiment, the RNC relocation process is performed by using the enhanced SRNC relocation process (i.e., direct communication between the SRNC and the target RNC without the need of forwarding by the core network), wherein the flat Node B+ is considered as an evolved RNC. As shown in FIG. 8, the method includes the following steps:

Step 800: The SRNC on a legacy UTRAN network decides to perform SRNC relocation. In this step, the decision may be triggered by reception of the measurement report of the user equipment, or reception of the uplink signaling transmission instruction sent by the target RNC requiring cell upgrade or URA (UTRAN Registration Area) upgrade, etc.

Step 801: The SRNC sends to the target RNC the relocation request message carrying the key data of the user equipment including the legacy key IK and/or CK. The key data can be carried in a transparent container sent by the SRNC to the target RNC.

Step 802: The target RNC stores the received legacy key IK and/or CK.

Step 803: The target RNC allocates resources for the user.

In this step, if the SRNC decides to let the target RNC send DL DCCH message and perform integrity protection on the message, the target RNC directly use the received legacy key IK to perform integrity protection on the message, and sends a relocation response message to the SRNC. Preferably, the relocation response message carries the security capability of the network.

When the target RNC does not have the enhanced security capability, the target RNC decides to use the legacy security mechanism regardless of the security capability of the user equipment.

Step 804: The SRNC sends a Physical Channel Reconfiguration message or a UTRAN Mobility Information message to the user equipment.

Step 805: The enhanced user equipment uses the legacy key IK to verify the received message.

Preferably, when the message is successfully verified, the user equipment determines, according to the received security capability of the network and the security capability of the UE itself, whether the legacy security mechanism or the enhanced security mechanism should be used. When either the network or the user equipment has no enhanced security capability, the user equipment decides to use the legacy security mechanism, which is the same as the SRNC relocation process in the legacy UMTS and needs no further elaboration. When both the network side and the user equipment have the enhanced security capability, execute Step 806.

Step 806: The enhanced user equipment sends the Physical Channel Reconfiguration Complete message or UTRAN Mobility Information Confirm message to the target RNC. The user equipment uses the legacy integrity key IK to perform integrity protection on the message, or uses the legacy integrity key IK and ciphering key CK to simultaneously perform integrity and encryption protection on the message.

Preferably, the message sent by the user equipment to the target RNC carries the security capability of the UE.

Step 807: After receiving the Physical Channel Reconfiguration Complete message or UTRAN Mobility Information Confirm message sent by the UE, the target RNC uses the legacy key to verify, or decrypt and verify, the message.

When the target RNC successfully verifies the message sent by the user equipment, the target RNC performs message exchange with the core network node (SGSN+ or MSC+) to inform the core network node of the completion of SRNC relocation. When the target RNC is connected with two CN nodes (SGSN+ and MSCR+) simultaneously, the target RNC performs message exchange with both CN nodes simultaneously.

Preferably, during its interaction with the core network node, the target RNC informs the core network of the security capability of the user equipment or instructs the core network to enable the enhanced security mechanism.

Step 808: The core network node (SGSN+ or MSC/VLR+) releases the Iu interface between the core network node itself and the SRNC.

Step 809: Optionally, the core network node initiates an AKA process.

Preferably, when there is an unused authentication vector at the core network node, or a currently used authentication vector corresponding to the legacy key, skip this step and directly proceed to Step 810.

Step 810: The core network node derives the intermediate key $K_{RNC}$ from the legacy key IK/CK.

Step 811: The core network node sends the target RNC (which is an RNC+) the security mode command message carrying the intermediate key $K_{RNC}$.

Preferably, the core network node derives the intermediate key variant $K_{RNC}^*$ from the legacy key IK/CK and the intermediate key $K_{RNC}$ and sends the intermediate key variant $K_{RNC}^*$ carried in the security mode command message to the target RNC+. The intermediate key variant $K_{RNC}^*$ is configured to upgrade the enhanced air interface keys $IK_U$ and $CK_U$ when a terminal performs SRNC relocation within the enhanced UTRAN network.

Preferably, the intermediate key variant $K_{RNC}^*$ is associated with a counter NCC. The intermediate key $K_{RNC}$ in Step 810 corresponds to a virtual intermediate key variant $K_{RNC}^*$, and the associated NCC is 0; the associated NCC value of the intermediate key variant $K_{RNC}^*$ derived by the core network node from the legacy key IK/CK and the intermediate key $K_{RNC}$ is 1.

Optionally, the NCC value is carried in the security mode command message and sent to the target RNC+.

Step 812: The target RNC derives the enhanced keys $IK_U$ and $CK_U$ from the intermediate key $K_{RNC}$.

Step 813: The target RNC sends to the user equipment the security mode command message, the integrity of which is protected using the enhanced key $IK_U$.

Step 814: The user equipment derives the intermediate key $K_{RNC}$ from the legacy key IK/CK.

Step 815: The user equipment derives the enhanced keys $IK_U$ and $CK_U$ from the intermediate key $K_{RNC}$. Alternatively, Step 814 and Step 815 can take place before Step 813.

Optionally, the user equipment derives the intermediate key variant $K_{RNC}^*$ from the legacy key IK/CK and the intermediate key $K_{RNC}$. The intermediate key variant is configured to upgrade the enhanced air interface keys $IK_U$ and $CK_U$ when a terminal performs SRNC relocation within the enhanced UTRAN network.

Preferably, the intermediate key variant $K_{RNC}^*$ is associated with a counter NCC. The intermediate key $K_{RNC}$ in Step 814 corresponds to a virtual intermediate key variant $K_{RNC}^*$, and the associated NCC is 0; the associated NCC value of the intermediate key variant $K_{RNC}^*$ derived by the user equipment from the legacy key IK/CK and the intermediate key $K_{RNC}$ is 1.

Step 816: The user equipment uses the enhanced key $IK_U$ to verify the received security mode command message, and if the verification is successful, sends to the target RNC a security mode complete message, the integrity of which is protected using the enhanced key $IK_U$.

Step 817: The target RNC uses the enhanced key $IK_U$ to verify the received security mode complete message, and if the verification is successful, sends the security mode complete message to the core network node.

In the embodiment, Step 810 to Step 817 are the same as the process in which the user equipment establishes the enhanced air interface key through the security mode command during initial attachment, FIG. 8 is merely an example. In addition, the enhanced air interface keys $IK_U$ and $CK_U$ can also be generated by the core network node, and sent to the target RNC in the security mode command message.

Figure 9:
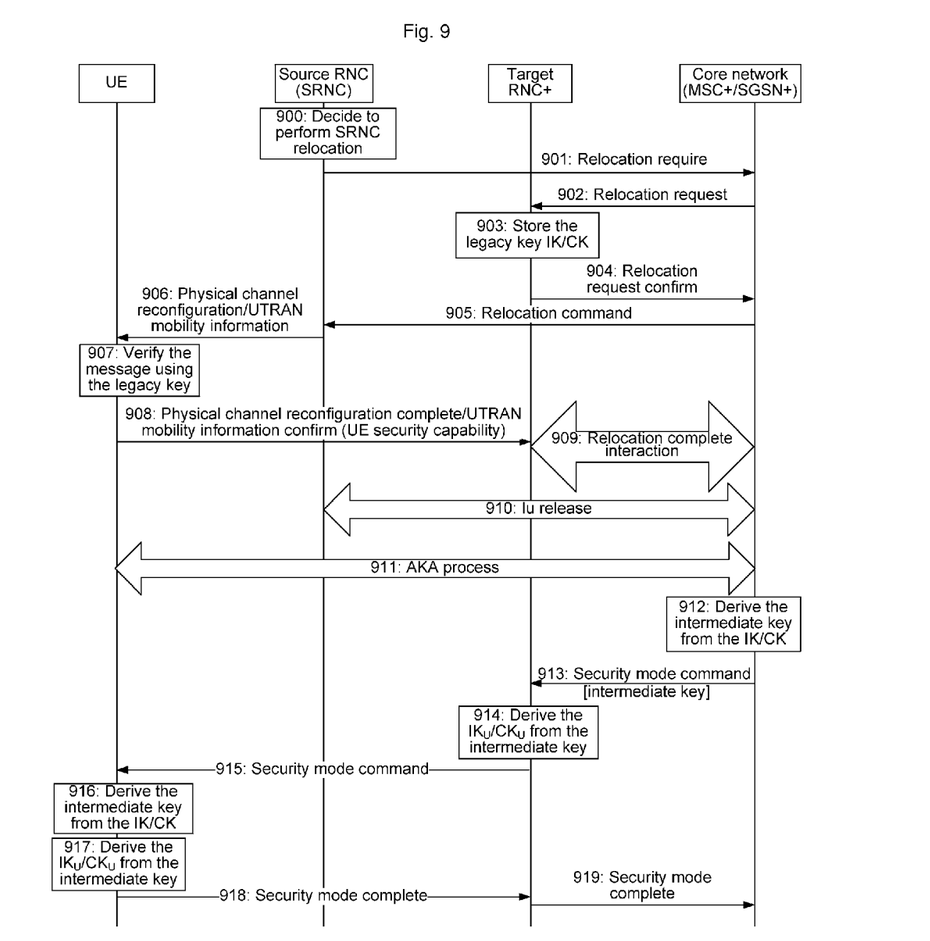
FIG. 9 is a flowchart of a second embodiment in which a security key is used when an enhanced user equipment moves from a legacy UTRAN network to an enhanced UTRAN network according to the disclosure.

FIG. 9 is a flowchart of a second embodiment in which a security key is used when an enhanced user equipment moves from a legacy UTRAN network to an enhanced UTRAN network according to the disclosure. The embodiment is of another method of using the security key when an enhanced user equipment moves from the legacy UTRAN network to the enhanced UTRAN network. In the second embodiment, the message interacted between the SRNC and the target RNC needs to be forwarded by the core network node (CNN+), i.e., SGSN+ or MSC+. As shown in FIG. 9, the method includes the following steps:

Step 900: The SRNC decides to perform SRNC relocation. In this step, the decision may be triggered by reception of the measurement report of the user equipment, or of the uplink signaling transmission instruction sent by the target RNC requiring cell upgrade or URA upgrade, etc.

Step 901: The SRNC sends a relocation require message to the core network node. If the SRNC is connected with two CNN+ (i.e., SGSN+ and MSC/VLR+) simultaneously, the SRNC sends the relocation require message to both CNN+ simultaneously. The key data comprising the legacy key IK and/or CK is carried in the relocation require message. The key data can be carried in a transparent container sent by the SRNC to the target RNC.

Step 902: The core network sends to the target RNC the relocation request message carrying the legacy key from the SRNC. The legacy key can be carried in the transparent container sent by the SRNC to the target RNC.

Step 903: The target RNC stores the received legacy key IK and/or CK.

Step 904: The target RNC allocates resources for the user. If the SRNC decides to let the target RNC send the DL DCCH message and perform integrity protection on the message, the target RNC directly use the received legacy key IK to perform integrity protection on the message, and sends a relocation request confirm message back to the SRNC. Preferably, the relocation request confirm message carries the security capability of the network. Before the relocation request confirm message is sent, the target RNC and the core network may establish a new Iu bearing to allocate resources such as RRC connection resources and radio link resources for the user equipment.

Preferably, when the target RNC does not have the enhanced security capability, the target RNC decides to use the legacy security mechanism regardless of the security capability of the user equipment.

Step 905: The core network sends to the SRNC a relocation command message carrying the parameters sent by the target RNC and forwarded via the source RNC to the user equipment.

In the above Step 901 to Step 905, when multiple SGSNs exist, SGSN relocation process may be performed. During the relocation, the security context of the user equipment stored in the serving SGSN+ is sent to the target SGSN, wherein the security context includes but is not limited to the legacy key IK/CK, and/or unused authentication vector, etc.

Step 906: The SRNC sends to the user equipment a Physical Channel Reconfiguration message or UTRAN Mobility Information message which preferably carries the parameters sent by the target RNC to the user equipment, wherein the parameters indicate the security capability of the network side.

Step 907: The user equipment uses the legacy key IK to verify the received message.

Optionally, when the received message is successfully verified, the user equipment determines whether the legacy security mechanism or the enhanced security mechanism should be used according to the received security capability of the network side and the security capability of the UE itself. When either the network side or the user equipment has no enhanced security capability, the user equipment decides to use the legacy security mechanism, which is the same as the SRNC relocation process in the legacy UMTS and needs no further elaboration. When both the network side and the user equipment have the enhanced security capability, the user equipment performs Step 908.

Steps 908 to 919 are specifically implemented in the same manner as Steps 806 to 817 in the embodiment shown in FIG. 8 and need no further elaboration.

Figure 10:
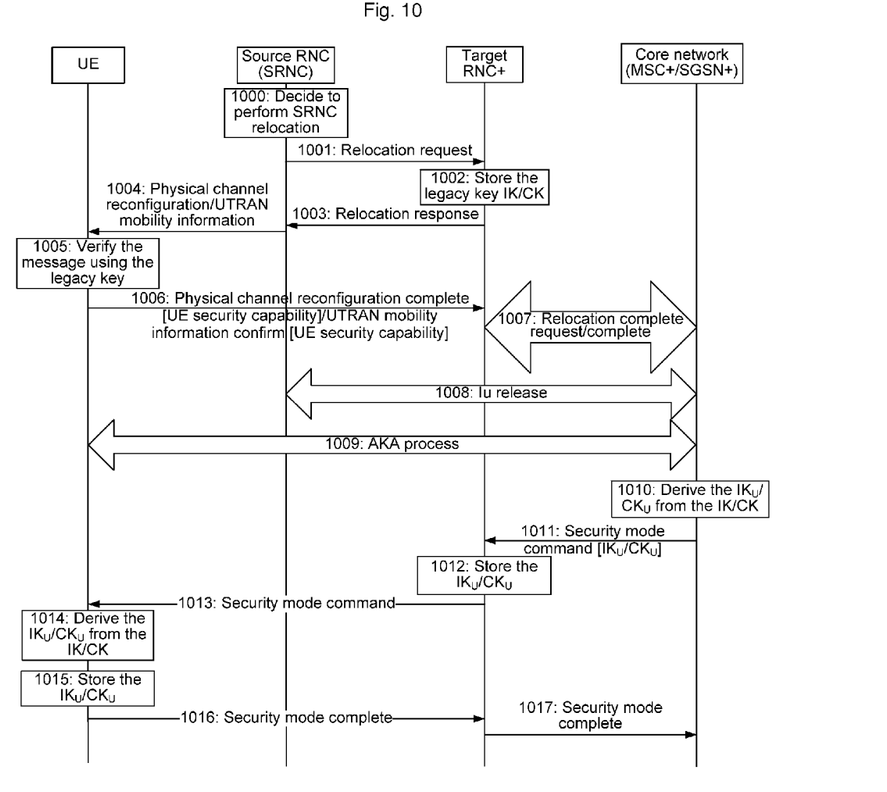
FIG. 10 is a flowchart of a third embodiment in which a security key is used when an enhanced user equipment moves from a legacy UTRAN network to an enhanced UTRAN network according to the disclosure.

FIG. 10 is a flowchart of a third embodiment in which a security key is used when an enhanced user equipment moves from a legacy UTRAN network to an enhanced UTRAN network according to the disclosure. The third embodiment differs from the first embodiment shown in FIG. 8 in that: the architecture of the enhanced key of the two is different. In the third embodiment, the core network node directly derives the enhanced key $IK_U/CK_U$ from the legacy key IK/CK and sends the $IK_U/CK_U$ to the target RNC+ in the security mode command message. As shown in FIG. 10, the method includes the following steps:

Steps 1001 to 1009, which are identical with Steps 801 to 809 in FIG. 8 and need no further elaboration.

Step 1010: The core network node derives the enhanced key $IK_U/CK_U$ from the legacy key IK/CK. Optionally, the parameters for deriving $IK_U/CK_U$ also include a random number or a counter.

Step 1011: The core network node sends to the target RNC (which is an RNC+) the security mode command message carrying the $IK_U/CK_U$.

Step 1012: The target RNC stores the received enhanced keys $IK_U$ and $CK_U$.

Step 1013: The target RNC sends to the user equipment the security mode command message, the integrity of which is protected using the enhanced key $IK_U$.

Step 1014: The user equipment derives the enhanced key $IK_U/CK_U$ from the legacy key IK/CK.

Optionally, the parameters for deriving $IK_U/CK_U$ also include a random number or a counter. The random number is the same as that used on the network side, and can be a random number generated by the SGSN+ in Step 1010 and sent to the user equipment during the SMC process, or an existing random number in the present process.

Step 1015: The user equipment stores the enhanced keys $IK_U$ and $CK_U$. Step 1014 and Step 1015 can also take place before Step 1013.

Steps 1016 to 1017, which are identical with Steps 816 to 817 in FIG. 8 and need no further elaboration.

Wherein the SRNC relocation process (Steps 1000 to 1008) in the third embodiment can also be replaced by the legacy SRNC relocation process (Steps 900 to 910) as shown in FIG. 9, namely, the communication between the source RNC and the target RNC is forwarded by the core network node. Steps 1010 to 1017 remain the same.

Figure 11:
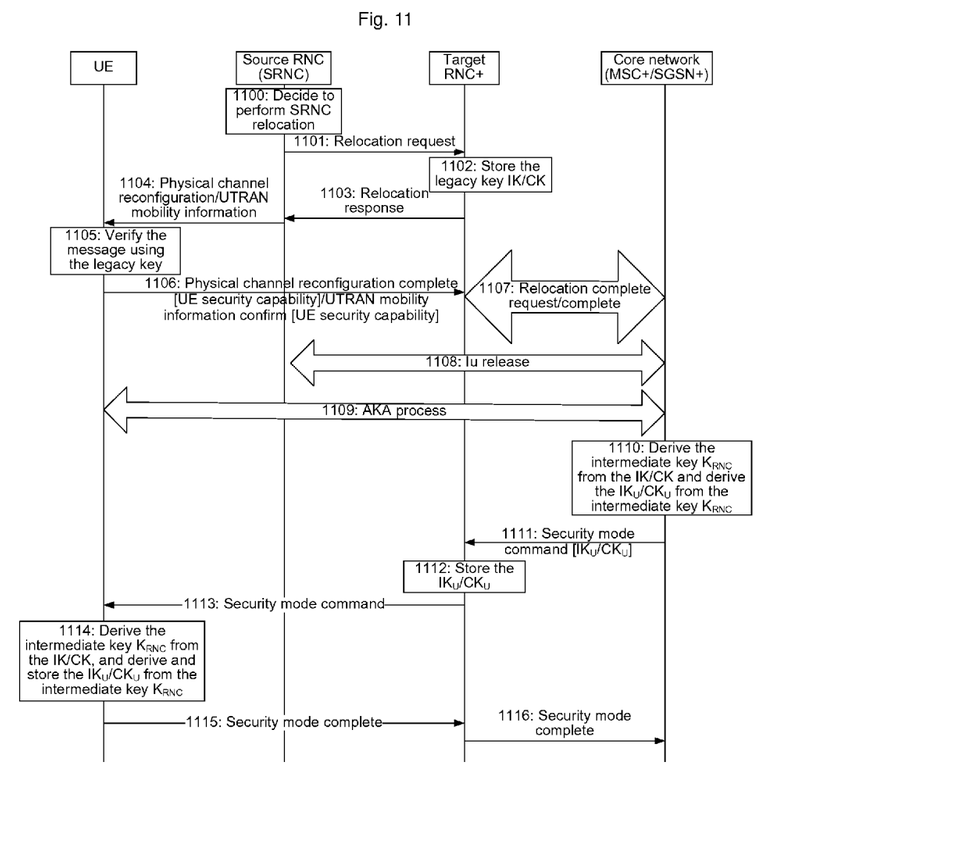
FIG. 11 is a flowchart of a fourth embodiment in which a security key is used when an enhanced user equipment moves from a legacy UTRAN network to an enhanced UTRAN network according to the disclosure.

FIG. 11 is a flowchart of a fourth embodiment in which a security key is used when an enhanced user equipment moves from a legacy UTRAN network to an enhanced UTRAN network according to the disclosure. The fourth embodiment differs from the first embodiment shown in FIG. 8 in that: in the fourth embodiment, the core network node derives the enhanced key $IK_U/CK_U$ from the intermediate key $K_{RNC}$ and sends the $IK_U/CK_U$ to the target RNC+ in the security mode command message. As shown in FIG. 11, the method includes the following steps:

Steps 1101 to 1109, which are identical with Steps 801 to 809 in FIG. 8 and need no further elaboration.

Step 1110: The core network node derives the intermediate key $K_{RNC}$ from the legacy key IK/CK and derives the enhanced key $IK_U/CK_U$ from the intermediate key $K_{RNC}$. Optionally, the parameters for deriving the intermediate key $K_{RNC}$ and/or $IK_U/CK_U$ also include a random number or a counter.

Step 1111: The core network node sends to the target RNC (which is an RNC+) the security mode command message carrying the $IK_U/CK_U$.

Step 1112: The target RNC stores the received enhanced keys $IK_U$ and $CK_U$.

Step 1113: The target RNC sends to the user equipment the security mode command message, the integrity of which is protected using the enhanced key $IK_U$.

Step 1114: The user equipment derives the intermediate key $K_{RNC}$ from the legacy key IK/CK and derives the enhanced key $IK_U/CK_U$ from the intermediate key $K_{RNC}$.

Optionally, the parameters for deriving intermediate key $K_{RNC}$ and/or $IK_U/CK_U$ also include a random number or a counter. The random number is the same as that used on the network side, and can be a random number generated by the SGSN+ in Step 1110 and sent to the user equipment during the SMC process, or an existing random number in the present process.

Step 1115: The user equipment stores the enhanced keys $IK_U$ and $CK_U$. Step 1114 and Step 1115 can also take place before Step 1013.

Steps 1116 to 1117 are identical with Steps 816 to 817 in FIG. 8 and need no further elaboration.

Wherein the SRNC relocation process (Steps 1100 to 1108) in the fourth embodiment can also be replaced by the legacy SRNC relocation process (Steps 900 to 910) as shown in FIG. 9, namely, the communication between the source RNC and the target RNC is forwarded by the core network node. Steps 1110 to 1117 remain the same.

The above is merely the preferred embodiments of the disclosure and is not intended to limit the scope of protection of the disclosure, and any modifications, equivalent replacements, improvements, and the like within the spirit and principle of the disclosure shall fall within the scope of protection of the invention.

The invention claimed is:

1. A method for establishing an enhanced air interface key, comprising:
during a serving Radio Network Controller (RNC) relocation process, when a user equipment relocates from a legacy source RNC to a target RNC with an enhanced security capability;
when the target RNC with an enhanced security capability cannot learn whether the user equipment supports the enhanced security capability from a relocation request sent by the source RNC, the target RNC enabling a received legacy key received from the source RNC and indicating the user equipment that the target RNC supports the enhanced security capability;
the user equipment verifying the indicating message by using the legacy air interface key;
the user equipment performing security protection on the message and/or data sent to the target RNC by using the legacy air interface key, and informing the target RNC the security capability of the user equipment;
the target RNC verifying the received message from the user equipment by using the legacy security key;
when the received message indicating that the user equipment supports the enhanced security capability, the target RNC notifying a core network to establish and enable the enhanced air interface keys at the network side and in the user equipment respectively;
when the received message indicating that the user equipment does not support the enhanced security capability, the target RNC performing security protection on the communication by using the legacy air interface key during or after the serving RNC relocation process; and
when the target RNC cannot learn from the received message from the user equipment whether the user equipment supports the enhanced security capability, the target RNC continuing to perform security protection on the communication during or after the serving RNC relocation process by using the legacy air interface key;
wherein the message from the user equipment is a Physical Channel Reconfiguration Complete message or a Universal Terrestrial Radio Access Network (UTRAN) Mobility Information Confirm message;
wherein the notifying the core network to establish and enable the enhanced air interface key at the network side and in the user equipment respectively comprises:
the core network initiating an Authentication and Key Agreement (AKA) and Security Mode Command (SMC) process, or an SMC process, establishing the enhanced air interface keys at the network side and in the user equipment respectively and enabling the enhanced air interface keys to perform security protection on subsequent communication;
wherein the target RNC enabling a received legacy key received from the source RNC and indicating the user equipment that the target RNC supports the enhanced security capability comprises:
the target RNC storing the received legacy key, allocating resources for the user, sending a Downlink Dedicated Control Channel (DL DCCH) message, and directly using the received legacy key to perform integrity protection on the message;
the target RNC and the core network establishing a new Iu bearing to allocate RRC connection resources and radio link resources for the user equipment;
sending a relocation request confirm message back to the source RNC, wherein the relocation request confirm message carrying the security capability the network.

2. The method according to claim 1, wherein, the SMC process is performed directly, when the core network node has an unused authentication vector or a currently used authentication vector corresponding to the legacy key.

3. The method according to claim 1, wherein the establishing the enhanced air interface key at the network side and in the user equipment respectively comprises:
the core network node deriving an intermediate key $K_{RNC}$ from the legacy key IK/CK; the core network node sending a security-mode command message in which the intermediate key $K_{RNC}$ is carried to the target Radio Network Controller (RNC); the target RNC deriving the enhanced keys $IK_U$ and $CK_U$ from the intermediate key $K_{RNC}$; the user equipment deriving the intermediate key $K_{RNC}$ from the legacy key IK/CK, and deriving enhanced keys $IK_U$ and $CK_U$ from the intermediate key $K_{RNC}$.

4. The method according to claim 3, further comprising:
the core network node deriving an intermediate key variant $K_{RNC}^*$ from the legacy key IK/CK and the intermediate key $K_{RNC}$, and sending the security mode command message carrying the intermediate key variant $K_{RNC}^*$ to the enhanced target RNC+.

5. The method according to claim 4, wherein the intermediate key variant $K_{RNC}^*$ is associated with a counter NCC; the intermediate key $K_{RNC}$ corresponds to a virtual intermediate key variant $K_{RNC}^*$, and the associated NCC is 0;
   a value of the NCC associated with the intermediate key variant $K_{RNC}^*$ derived by the core network node from the legacy key IK/CK and the intermediate key $K_{RNC}$ is 1.

6. The method according to claim 5, wherein the value of the NCC is carried in the security-mode command message sent to the enhanced target RNC+.

7. The method according to claim 1, wherein the establishing the enhanced air interface keys at the network side and in the user equipment respectively comprises:
   the core network node deriving the enhanced keys $IK_U/CK_U$ from the legacy key IK/CK; the core network node sending the security-mode command message in which the $IK_U/CK_U$ is carried to the target RNC; the target RNC storing the received $IK_U/CK_U$; the user equipment deriving the enhanced keys $IK_U$ and $CK_U$ from the legacy key IK/CK and storing the enhanced keys $IK_U$ and $CK_U$.

8. The method according to claim 1, wherein the establishing the enhanced air interface keys at the network side and in the user equipment respectively comprises:
   the core network node deriving an intermediate key $K_{RNC}$ from the legacy key IK/CK, and deriving the enhanced keys $IK_U/CK_U$ from the intermediate key $K_{RNC}$; the core network node sending the security mode command message in which the $IK_U/CK_U$ is carried to the target RNC; the target RNC storing the received $IK_U/CK_U$; the user equipment deriving the intermediate key $K_{RNC}$ from the legacy key IK/CK, deriving the enhanced keys $IK_U/CK_U$ from the intermediate key $K_{RNC}$ and storing the enhanced keys $IK_U/CK_U$.

9. The method according to claim 1, further comprising:
   when the target RNC learns that the User Equipment (UE) supports the enhanced security capability from the message received from the source RNC, the target RNC deriving and enabling the enhanced air interface keys to perform security protection on the communication in the serving RNC relocation process.

10. The method according to claim 1, further comprising:
    when the target RNC does not support the enhanced security capability,
    performing security protection on the communication by using the legacy air interface key during or after the serving RNC relocation process.

11. A system for establishing an enhanced air interface key, comprising at least a source RNC, a target RNC, a core network node and a user equipment, wherein,
    during a serving RNC relocation process, when a user equipment relocates from a legacy source RNC to a target RNC with an enhanced security capability;
    the source RNC is configured to send a relocation request to the target RNC during relocation;
    the target RNC is configured to enable a received legacy key received from the source RNC and to indicate the user equipment that the target RNC supports the enhanced security capability when the target RNC cannot learn whether the user equipment supports the enhanced security capability from the relocation request sent by the source RNC;
    to verify a received message from the user equipment by using the legacy security key and notify the core network to establish and enable the enhanced air interface keys at the network side and in the user equipment respectively when the user equipment supports the enhanced security capability;
    to perform security protection on the communication by using the legacy air interface key during or after the serving RNC relocation process when the user equipment does not support the enhanced security capability; and
    to perform security protection on the communication during or after the serving RNC relocation process by using the legacy air interface key when the target RNC cannot learn from the received message from the user equipment whether the user equipment supports the enhanced security capability;
    the core network node is configured to receive the notification from the target RNC, which triggers a process of establishing and enabling the enhanced air interface keys at the network side and in the user equipment respectively;
    wherein the message from the user equipment is a Physical Channel Reconfiguration Complete message or a Universal Terrestrial Radio Access Network (UTRAN) Mobility Information Confirm message;
    wherein the notifying the core network to establish and enable the enhanced air interface key at the network side and in the user equipment respectively comprises:
    the core network initiating an Authentication and Key Agreement (AKA) and Security Mode Command (SMC) process, or an SMC process, establishing the enhanced air interface keys at the network side and in the user equipment respectively and enabling the enhanced air interface keys to perform security protection on subsequent communication:
    wherein the target RNC is configured to enable a received legacy key received from the source RNC and to indicate the user equipment that the target RNC supports the enhanced security capability comprises:
    the target RNC is configured to store the received legacy key, to allocate resources for the user, to send a Downlink Dedicated Control Channel (DL DCCH) message, and to directly use the received legacy key to perform integrity protection on the message;
    the target RNC is configured to establish a new Iu bearing with the core network to allocate RRC connection resources and radio link resources for the user equipment;
    to send a relocation request confirm message back to the source RNC, wherein the relocation request confirm message carrying the security capability of the network.

12. The system according to claim 11, wherein, when the target RNC does not support the enhanced security capability, the target RNC is further configured to perform security protection on the communication by using the legacy air interface key during or after the serving RNC relocation process.

13. The system according to claim 12, wherein the core network node is a Service General Packet Radio Service (GPRS) Support Node (SGSN+) supporting a High Speed Packet Access (HSPA+) security function or a Mobile Switching Center (MSC+) supporting the HSPA+ security function.

* * * * *